United States Patent Office 3,245,965
Patented Apr. 12, 1966

3,245,965
POLYPHTHALOCYANINES
William B. Tuemmler, Catonsville, Md., assignor to Monsanto Company, a corporation of Delaware
No Drawing. Filed Nov. 13, 1957, Ser. No. 696,027
17 Claims. (Cl. 260—78.4)

This invention relates to a new class of materials, which are polyphthalocyanines, and to the process of preparing same.

The phthalocyanines are a well-known class of materials, which are also known as tetrabenzotetrazaporphins or tetrabenzoporphyrazines, and have the structure (I)
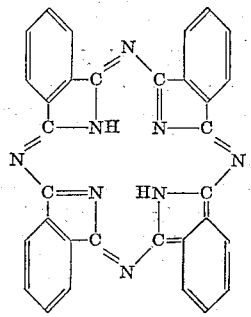

Phthalocyanine is a strong chelating agent and readily forms metal phthalocyanines under many conditions, thus metal phthalocyanines have been prepared from metals which belong to every group of the periodic table, for example, copper phthalocyanine has the structure (II)
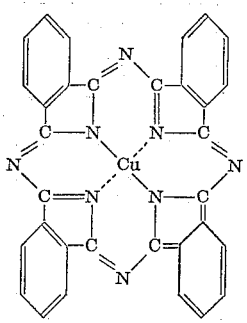

The principal object of this invention is to provide new compositions of matter which are useful as pigments and as semi-conductor materials. Another object of this invention is to provide metal-free polyphthalocyanine. Still another object of this invention is to provide metal polyphthalocyanines. A further object of this invention is the process of preparing metal-free polyphthalocyanine and metal polyphthalocyanines by heating pyromellitonitrile above the melting point in the absence of oxygen to provide the metal-free product, or by heating pyromellitonitrile above the melting point in the absence of oxygen and in the presence of finely divided metals or metal salts to form the corresponding metal polyphthalocyanine. Other objects and advantages of this invention will be apparent to those skilled in the art from the following disclosure.

It has now been found that pyromellitonitrile can be readily converted to a new class of polyphthalocyanines which are useful as improved pigment materials and as semi-conductor materials. Pyromellitonitrile is a new compound the preparation of which is disclosed and claimed in my copending application, Serial No. 696,026, filed November 13, 1957, and now abandoned. The tetrafunctional pyromellitonitrile provides the new class of polymeric materials which can be illustrated by the structural formula (III)
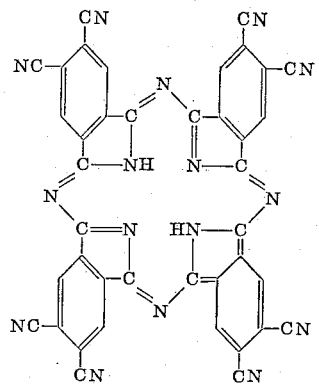

The pair of nitrile groups on each of the four cyclic portions of the phthalocyanine structure are in turn joined with and form a part of similar phthalocyanine structures to provide a polyphthalocyanine. Whereas the above structural formula is illustrative of the metal-free polyphthalocyanine, it will be readily understood that the metal polyphthalocyanines will have a simiar structure to III above, but, for example, with the presence of the metal as in II above.

It has also been found that useful polymeric phthalocyanines can be prepared by copolymerizing phthalonitrile with pyromellitonitrile. However, to assure the preparation of a substantial amount of the polymeric phthalocyanines it is necessary that the pyromellitonitrile comprises at least about 50 mole percent of the mixture. The copolymer product generally can be subjected to vacuum sublimation, if desirable, to remove any small quantity of monomeric phthalocyanines which may be formed in the process.

The polymerization of the pyromellitonitrile is effected by heating the pyromellitonitrile to a temperature above its fusion point, for example, from about 267° C. to about 450° C., or higher, and preferably at a temperature of from about 300° C. to about 350° C., in the absence of oxygen for a suitable time to provide a desirable amount of the polyphthalocyanine. Whereas overnight times of about 18 hours have been employed in many experiments, a longer or shorter period of time can be employed. The time selected will vary somewhat with the temperature employed and the particular system being treated. Generally times of from about 2 to about 18 hours are sufficient to provide a substantial yield of the desired polymeric material.

For the preparation of metal-free polyphthalocyanines, the presence of a hydrogen source is desirable, as for example, acetamide, triethanol amine, methyl glutamine, phenols, naphthols, aliphatic hydroxy compounds, and the like. However, the pyromellitonitrile itself can supply the necessary hydrogen to prepare the metal-free polyphthalocyanines.

Suitable metals and salts thereof which can be utilized in the preparation of the polymeric metal phthalocyanines embrace the metals which are known in the prior art to form monomeric metal phthalocyanines. Preferred metals are, for example, zinc, copper, iron, cobalt, nickel, palladium and platinum. Other suitable metals are manganese, chromium, molybdenum, vanadium, beryllium, magnesium, silver, mercury, aluminum, tin, lead, antimony, calcium, barium, cadmium, and other metals. Illustrative suitable metal salts are cuprous chloride, cuprous bromide, cuprous cyanide, cuprous ferricyanide, zinc chloride, zinc bromide, zinc iodide, zinc cyanide, zinc ferrocyanide, zinc acetate, zinc sulfide, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride and the like. The preferred salts are those obtained from the inorganic acids, especially the various metal halides.

Thus the polymeric materials of this invention are, for example, polyphthalocyanine, zinc polyphthalocyanine, copper polyphthalocyanine, iron polyphthalocyanine, cobalt polyphthalocyanine, nickel polyphthalocyanine, palladium polyphthalocyanine, platinum polyphthalocyanine, lead polyphthalocyanine, magnesium polyphthalocyanine, and the like.

In the preparation of the metal polyphthalocyanines the ratio of metal to pyromellitonitrile will be readily apparent to those skilled in the art depending on the desired product. Thus, for example, one atom of copper per four moles of phthalonitrile is required to form the monomeric copper phthalocyanine. However, in the ideal polymer of infinite size the limiting ratio of copper atoms to moles of pyromellitonitrile will approach the limit 1:2 to prepare the copper polyphthalocyanine. Lesser quantities of copper can of course be employed to prepare various polymeric phthalocyanines which contain metal-free units in the polymer. Also greater amounts of copper can be employed and subsequently the excess can be washed from the polymer. The desirable limits for the various other metals will be apparent to those skilled in the art.

The new polymeric materials do not sublime, whereas sublimation under a low pressure is characteristic of many of the monomeric phthalocyanines of the prior art. Also there are no known solvents for the new polymeric materials. In view of the inert character of the new polymeric materials no known method is available to determine their molecular weight, but from a comparison with the physical properties of the known monomeric phthalocyanines it is clear that the polymeric phthalocyanines are a unique class of materials.

The polyphthalocyanines and metal polyphthalocyanines are useful as pigments in the preparation of surface coatings such as colored lacquers and paints; in the manufacture of colored plastics, where their high temperature stability permits application in injection molding and the like without color degradation; in the manufacture of various rubber articles; in the treatment of leather and cloth; in the manufacture of colored printing inks; and other applications where a pigment of high color fastness, high temperature stability, and high resistance to solvents and the like is desired. The polyphthalocyanines are also useful as semi-conductors.

The following examples are illustrative of this invention.

Example 1

A mixture consisting of 88 parts by weight of pyromellitonitrile and 44 parts by weight of finely divided cuprous chloride was introduced into a bomb which was purged of oxygen and heated at 350° C. under 2000 p.s.i. of nitrogen for 18 hours. The bomb and contents were cooled and the reaction mixture removed therefrom. The product was pulverized and subjected to vacuum sublimation purification procedure to remove any volatile components therefrom, which consisted of heating the product at 360° C. at 0.3 mm. of mercury for 4 hours. No sublimate was obtained during the treatment. The finely divided reaction mixture was washed with hot water to remove any uncombined copper salts therefrom and then dried. The treated polymeric copper phthalocyanine residue was found to be 124 parts by weight.

For comparative purposes a commercial sample of monomeric copper phthalocyanine was evaluated and found to have a resistivity substantially greater than the polymeric composition. This polymeric copper phthalocyanine was also useful as an inert, stable pigment composition having a bluish-black color.

Example 2

A mixture of 3.56 gm. of pyromellitonitrile and 1.0 gm. of finely ground cuprous chloride was heated in a glass-lined bomb in the absence of oxygen at 295 to 300° C. and 2600 to 2700 p.s.i. of nitrogen for 4 hours. The reaction mixture was pulverized, boiled with a dilute solution of hydrochloric acid, washed with water, then with a warm dilute solution of potassium hydroxide, then with water and finally with hot acetone. Little or no color was removed by any of these washes. The product was dried at 100° C. in a vacuum oven overnight and 3.5 gm. of a blue solid material was obtained, which was identified as a polymeric copper phthalocyanine.

Attempted sublimation of this material at 500° C. and pressures less than one micron and then at a red heat failed. This polymeric copper phthalocyanine was also found to be insoluble in boiling nitrobenzene, α-chloronaphthalene, acetonitrile, triethylene glycol and exhibited only a very slight solubility in boiling quinoline and trichloroacetic acid.

Example 3

A mixture consisting of 44 parts by weight phthalonitrile, 44 parts by weight pyromellitonitrile, and 72 parts by weight of finely divided cuprous chloride was introduced into a closed vessel which was purged of oxygen by sweeping the vessel with nitrogen. Then the bomb was sealed and the mixture heated to 300° C. for 18 hours. The reaction mixture was then pulverized and heated under vacuum (1 mm. mercury) at 340° C. for 8 hours and a small amount of organic sublimate was recovered. The reaction mixture was heated again at 360° C. under 0.3 mm. of mercury for 6 hours, during which time no additional sublimate was obtained. Then the reaction mixture was well washed with hot water to remove any remaining copper salt therefrom, and dried. The remaining copolymeric residue was found to be 88 parts by weight.

This copolymeric composition was useful as an inert, stable pigment composition having a bluish-black color.

Example 4

A mixture consisting of 15 parts by weight of pyromellitonitrile and 5 parts by weight of acetamide was introduced into a glass-lined autoclave, which was purged of oxygen. The mixture was then heated at 425° C. for 3 days. The reaction mixture was then cooled and pulverized, washed with 300 ml. of hot ethanol and dried overnight to yield about 15 parts by weight of a blue-black powder.

A similar experiment was conducted by heating at 320° C. for 18 hours with substantially the same results.

The polymeric phthalocyanine was found to be useful as an inert, stable pigment composition and as a semi-conductor material.

I claim:
1. The compositions of matter comprising polyphthalocyanines of the class represented by the structural formula

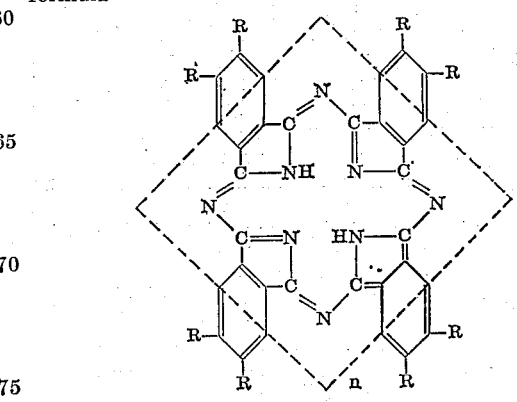

wherein the blocked-portion of said formula is the repeating structural phthalocyanine unit, $n$ is an integer of at least 2 and the R substitutents are selected from the group consisting of —H, nitrile groups —C≡N, and the linking groups

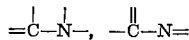

and

said nitrile groups being present only as a pair in ortho-position one to the other on the six-carbon atom, unsaturated hydrocarbon ring; and said linking groups being present only as a pair in ortho-position one to the other on at least one of the six-carbon atom, unsaturated hydrocarbon rings and form a portion of an adjoining phthalocyanine unit wherein the 1,2,4,5-substituted, six-carbon atom, unsaturated hydrocarbon ring is mutually shared between the two phthalocyanine units; and that portion of any phthalocyanine unit not joined to at least one other phthalocyanine units consists of the remainder of the six-carbon atom, unsaturated hydrocarbon ring, wherein such remainder is selected from the structural group consisting of and

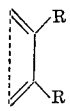

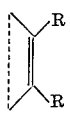

and the R substituents are selected from the group consisting of —H and said nitrile groups; and metal derivatives of said polyphthalocyanines, wherein the metal is a central metal atom within a phthalocyanine unit of the polyphthalocyanine composition.

2. The compositions of matter of claim 1 wherein the metal atom is centrally located by replacement of a hydrogen atom of the imide group of the repeating structural phthalocyanine unit and said metal atom is selected from the group consisting of copper, zinc, iron cobalt, nickel, manganese, chromium, aluminum, lead, antimony, and magnesium.

3. The composition of matter polyphthalocyanine, wherein the plurality of phthalocyanine units are linked by mutual sharing one of their 1,2,4,5-substituted, six-carbon atom, unsaturated hydrocarbon rings, containing double bonds.

4. The composition of matter copper polyphthalocyanine, wherein the plurality of phthalocyanine units are linked by mutual sharing one of their 1,2,4,5-substituted, six-carbon atom, unsaturated hydrocarbon rings, containing double bonds.

5. The composition of matter zinc polyphthalocyanine, wherein the plurality of phthalocyanine units are linked by mutual sharing one of their 1,2,4,5-substituted, six-carbon atom, unsaturated hydrocarbon rings, containing double bonds.

6. The composition of matter lead polyphthalocyanine, wherein the plurality of phthalocyanine units are linked by mutual sharing one of their 1,2,4,5-substituted, six-carbon atom, unsaturated hydrocarbon rings, containing double bonds.

7. The composition of matter magnesium polyphthalocyanine, wherein the plurality of phthalocyanine units are linked by mutual sharing one of their 1,2,4,5-substituted, six-carbon atom, unsaturated hydrocarbon rings, containing double bonds.

8. The compositions of matter copolymeric copper phthalocyanines prepared by the copolymerization of a mixture of pyromellitonitrile and phthalonitrile, wherein the pyromellitonitrile is present in an amount consisting of at least about 50 mole percent of said mixture, by heating said mixture in the presence of a finely divided copper salt and in an inert atmosphere at a temperature above the fusion point of the mixture for a time sufficient to provide a polymeric material characterized by its inability to sublime at about 360° C. under a pressure of 0.3 mm. of mercury.

9. The compositions of matter of claim 8, wherein the temperature of copolymerization of the mixture is about 300° C.

10. The process of preparing polyphthalocyanines comprising heating pyromellitonitrile in an inert atmosphere and in the presence of a hydrogen source to a temperature above the fusion point of the pyromellitonitrile and up to about 450° C., wherein the plurality of phthalocyanine units are linked by mutually sharing one of their 1,2,4,5-substituted, six-carbon atoms, unsaturated hydrocarbon rings, containing double bonds.

11. The process of preparing metal polyphthalocyanines comprising heating pyromellitonitrile in an inert atmosphere and in the presence of a member of the group consisting of finely-divided metals and metal salts to a temperature above the fusion point of the pyromellitonitrile and up to about 450° C., wherein the plurality of phthalocyanine units are linked by mutually sharing one of their 1,2,4,5-substituted, six-carbon atoms, unsaturated hydrocarbon rings, containing double bonds.

12. The process of claim 11, wherein the finely divided metal component is present in an amount of up to about 0.5 gram atoms of metal per mole of pyromellitonitrile.

13. The process of claim 11, wherein the temperature is from about 300° to about 350° C.

14. The process of claim 12, wherein the metal salt is cuprous chloride.

15. The process of claim 12, wherein the metal salt is zinc chloride.

16. The process of claim 12, wherein the metal salt is lead chloride.

17. The process of claim 12, wherein the metal is magnesium.

References Cited by the Examiner

UNITED STATES PATENTS

| | | | |
|---|---|---|---|
| 2,197,459 | 4/1940 | Wyler | 260—314.5 |
| 2,213,726 | 9/1940 | Wyler | 260—314.5 |
| 2,492,732 | 12/1949 | Bucher | 260—314.5 |
| 2,513,098 | 6/1950 | Kropa et al. | 260—314.5 |
| 2,805,957 | 9/1957 | Ehrich | 260—314.5 |

FOREIGN PATENTS 698,049  10/1953  Great Britain.

OTHER REFERENCES

Winslow et al.: Journal Amer. Chem. Soc., vol. 77, pages 4751–4756 (September 1955).

Dent et al.: Journal of the Chemical Society (London), 1936, pages 1027–1031.

Drinkard, Jr.: Studies on the Oxidative and Thermal Stability of Complex Inorganic Compounds, University of Illinois, 1956, found in Doctoral Dissertations Series, University Microfilm 19,815, Ann Arbor, Michigan.

Dent et al.: Journal of the Chemical Society (London), 1934, part II, pages 1027–1039.

Linstead et al.: Journal of the Chemical Society (London), 1934, part II, pages 1022–1027.

JOSEPH SCHOFER, *Primary Examiner.*

P. E. MANGAN, MILTON STERMAN, J. R. LIBERMAN, LEON J. BERCOVITZ, *Examiners.*